United States Patent [19]

Menaut

[11] 3,908,839

[45] Sept. 30, 1975

[54] SILO AND MEANS FOR REMOVING PARTICULATE MATERIAL THEREFROM

[76] Inventor: Jean Menaut, 40370 Rion-des-Landes, France

[22] Filed: Oct. 1, 1973

[21] Appl. No.: 402,400

[30] Foreign Application Priority Data
Oct. 16, 1972 France .................. 72.36607

[52] U.S. Cl. .................. 214/17 DA; 222/412
[51] Int. Cl.² .................. A01F 25/00; B65G 65/30
[58] Field of Search ...... 214/17 D, 17 DA; 222/412, 222/413

[56] References Cited
UNITED STATES PATENTS

| | | | |
|---|---|---|---|
| 3,180,525 | 4/1965 | Fabian et al. | 222/412 X |
| 3,259,538 | 7/1966 | Schnyder | 214/17 DA |
| 3,260,382 | 7/1966 | Klover | 214/17 D |
| 3,532,232 | 10/1970 | Sukup | 214/17 DA |
| 3,542,216 | 11/1970 | Baltz | 214/17 DA |
| 3,563,399 | 2/1971 | Shivers | 214/17 DA |
| 3,766,664 | 10/1973 | Burgin | 214/17 DA |

FOREIGN PATENTS OR APPLICATIONS
685,333   3/1965   Italy .................. 214/17 DA

*Primary Examiner*—Allen N. Knowles
*Attorney, Agent, or Firm*—Stevens, Davis, Miller & Mosher

[57] ABSTRACT

A silo having an Archimedean screw arranged to sweep the floor of the silo to urge material towards a central discharge port of said floor and a support outside said silo having end bearings, to receive ends of the screw shaft which project outside said bearings, to orbit said silo and to carry said screw for sweeping movement without in any way obstructing the discharge port on the floor of the silo.

6 Claims, 2 Drawing Figures

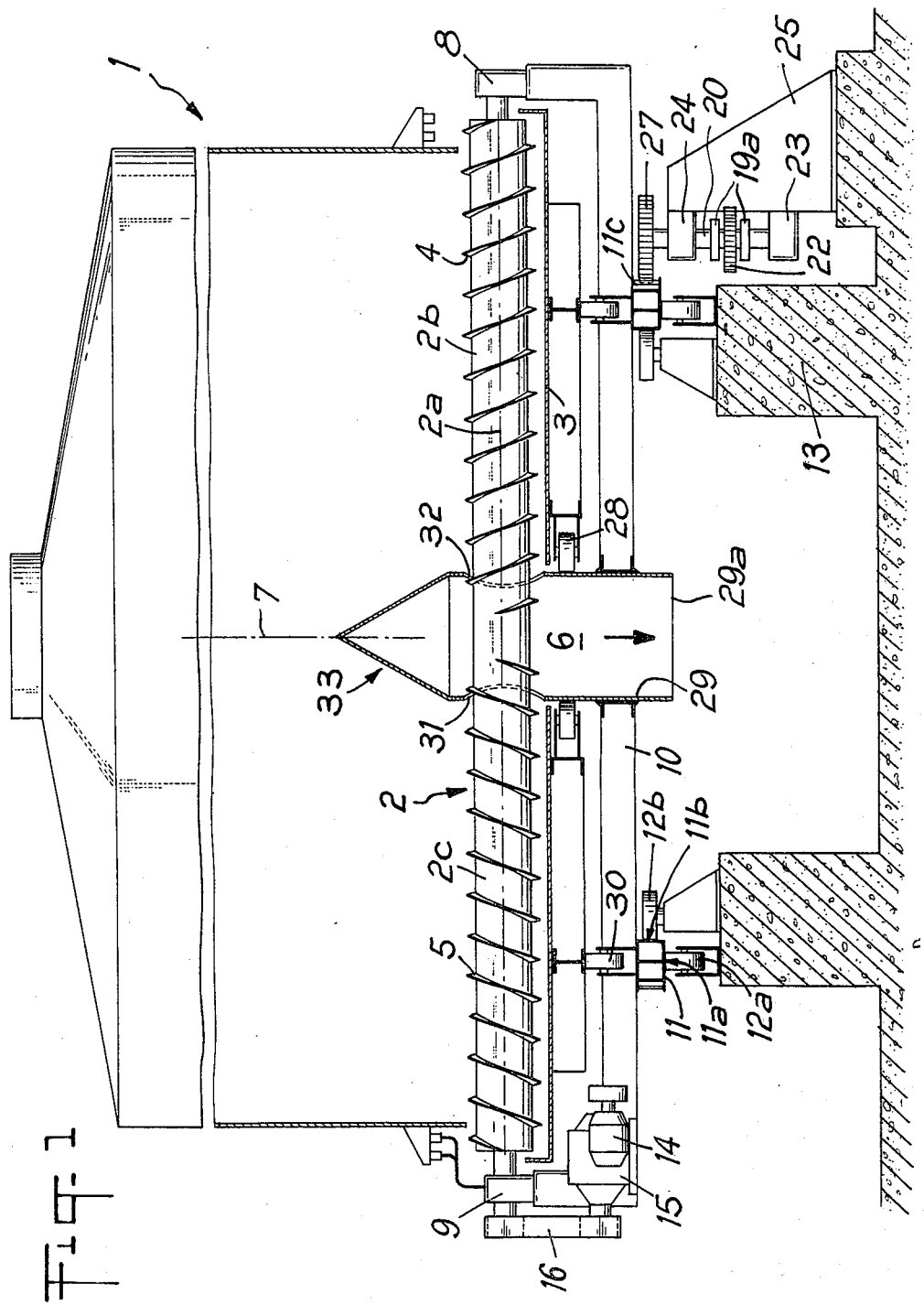

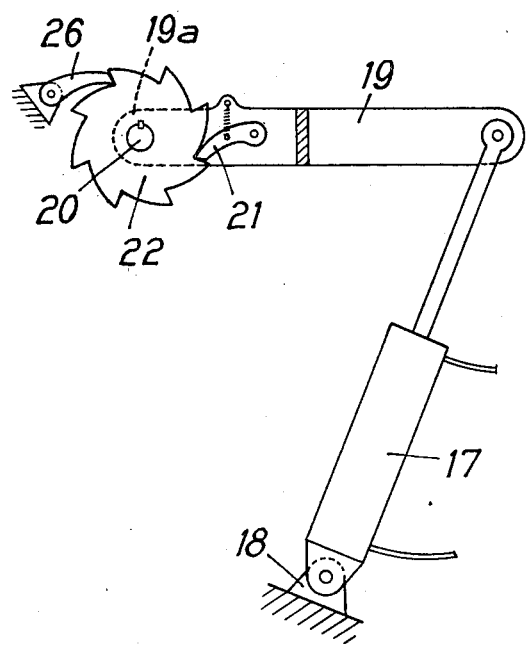

SILO AND MEANS FOR REMOVING PARTICULATE MATERIAL THEREFROM

The present invention relates to a storage silo for a material in particulate state, of the kind including an extractor device which comprises an Archimedean screw horizontally disposed in the container of the silo near the bottom wall and adapted to be driven both to rotate about its axis and to sweep the section of the silo, the screw being provided with flights oriented in such manner as to be able to entrain the particulate material contained in the silo towards a discharge port formed in the wall of said silo. At least the lower end of the silo has a circular section with the discharge port of said silo fashioned in a central zone of the bottom wall and the Archimedean screw is disposed diametrically right across the bottom wall of the silo and adapted to sweep by rotation about a vertical central axis of the silo, substantially coaxial with the silo discharge port, the portions of the Archimedean screw situated to either side of the discharge port each being provided with a flight winding in the sense opposed to that of the flights of the other portion.

In a known silo of this kind the support bearings for the Archimedean screw are placed within the container or body of the silo in a median zone at the location of the discharge port. The result is that in this known silo access to the said bearings is inconvenient so that assembly or dismantling of the Archimedean screw and maintenance of the bearings are rendered difficult.

The invention eliminates these disadvantages and is especially aimed at obtaining a silo with evacuation through a central opening while allowing easy access to the mechanical extraction elements other than the screw itself.

According to one aspect of the present invention there is provided a silo for storage of a material in particulate form, including a container having a circular floor; a discharge port located centrally of said floor; an Archimedean screw horizontally disposed within and adjacent the floor of the container; means for driving the screw for rotation about its own axis; means for driving the screw for movement sweeping the cross-section of the silo; and flights on the screw oriented in such a manner as to be able to drive particulate material contained in the silo towards the discharge port located centrally of said circular floor; the Archimedean screw extending diametrically across the floor of the silo, and projecting outwardly beyond the side wall of the silo to be mounted in two end bearings placed exteriorly of the body of the silo, said screw bearings being mounted for circular orbiting motion about a vertical axis substantially coaxial said circular floor; and the portions of the Archimedean screw situated at either side of the discharge port being provided with respective flights winding in opposed directions.

Thus, in such a silo it is possible to place, in simple manner, exteriorly of the container of the silo the elements supporting the Archimedean screw and its bearings as well as the drive means for both the rotation and the sweeping of the screw.

Consequently the mechanical extraction elements other than the screw itself are now readily accessible so that it is no longer necessary to empty the full silo manually for repair or for maintenance of those mechanical elements.

Moreover, in this silo the flights of the Archimedean screw can extend over all of its length and thus be suitable for ensuring the total and uniform extraction of the material contained in said silo as a result of the said screw sweeping the entire surface of the bottom wall of said silo.

In order that the present invention may more readily be understood, the following description is given merely by way of example with reference to the accompanying drawings in which:

FIG. 1 shows a schematic view, in elevation and in vertical axial section, of one embodiment of silo according to the invention; and FIG. 2 shows schematically and in plan view the drive means of the sweeping movement of the Archimedean screw of FIG. 1.

In the drawing there is shown a silo 1 containing material in particulate condition such as pulverulent material, granules, flat wood shavings or wood chips.

The silo 1 includes an extractor device comprising an Archimedean screw 2 which is horizontally disposed in the container of the silo 1 near its bottom wall or floor 3.

The Archimedean screw 2 executes on the one hand a movement of rotation about its axis 2a and on the other hand a sweeping movement of the horizontal section of the silo 1.

To this end the Archimedean screw 2 is provided with flights 4, 5 oriented such as to be able to entrain the particulate material contained in the silo 1 toward a discharge port 6 fashioned in the floor 3 of said silo 1.

The silo 1 is of cylindrical configuration so that it has a constant circular section along its axis and the discharge port 6 is fashioned in a central zone of the circular floor 3 of the silo. The Archimedean screw 2, arranged along a diameter of the circular floor 3, extends right across the floor to project at either side beyond the lateral wall of the silo 1. Moreover the screw is capable of a sweeping movement consisting of rotation about the vertical axis of symmetry 7 of the silo 1, called the central axis of the silo, substantially coaxial with the discharge port 6.

The Archimedean screw is divided in two portions 2b, 2c situated at either side of the central axis 7 of the silo 1, i.e. at either side of the discharge port 6. Each of the portions 2b, 2c is provided with respective flights 4, 5 each of which winds around the axis 2a of the screw 2 in a sense opposed to that of the other portion 2c, 2b of the screw. Thus the flights 4, 5 are suitable for leading the particulate material toward the central opening 6 when the screw 2 is driven to rotate in the appropriate direction about its axis 2a.

The Archimedean screw 2 is mounted for rotation about its axis 2a in two end support roller bearings 8, 9 both placed exteriorly of the body of the silo 1 and secured to a common intermediate support or intermediate chassis 10 disposed below the floor 3.

The chassis 10 is itself mounted for rotation about the central axis 7 of the silo on a stationary circular support coaxial with said central axis of the silo 1.

To this end the intermediate chassis has, jutting out from its lower surface, a profiled circular reinforcement member 11 centered on the axis 7 and forming annular rolling tracks 11a, 11b perpendicular to each other and respectively cooperating with horizontal axis rollers 12a and vertical axis rollers 12b, the said rollers 12a, 12b having stationary axes and being mounted on concrete feet 13 fo the silo foundations so that the said chassis 10 is mounted for rotation about the axis 7.

For its rotation about its axis 2a the Archimedean screw 2 is connected to screw drive means mounted on the intermediate chassis 10. These screw drive means consist of a motor 14 coupled to a variable speed drive 15 which is in turn rotatably connected to the screw 2 via a belt or chain 16.

The intermediate chassis 10 is also connected, for its rotation about the axis 7, to sweep drive means, integral with the foundations. As can be seen in greater detail in FIG. 2 the sweep drive means comprise a torque limiting device of calibrated strength, consisting of a double-action hydraulic jack 17 articulated by its cylinder on a support 18 integral with the foundations and by the end of its piston rod to a forked lever 19 which is in turn mounted for rotation on a vertical shaft 20 by the ends of the arms 19a of the fork. The lever 19 carries a drive pawl 21 adapted to cooperate with a ratchet wheel 22 which is keyed to the vertical shaft 20. The shaft 20 is in turn mounted in two bearings 23, 24 (FIG. 1) plugged to a pedestal 25 integral with the foundations. A further pawl 26 having a stationary axis prevents the ratchet wheel 22 rotating in the anticlockwise direction as viewed in FIG. 2. A cog wheel 27 engaged with a toothed crown 11c of the circular reinforcement rail 11 is keyed to the upper end of the shaft 20.

The floor 3 of the silo 1 is floatingly mounted on the reinforcement rail 11 of the intermediate chassis 10 so as to rotate freely about the central axis 7 of the silo 1.

For this purpose the floor 3 comprises vertical axis guide rollers 28 which roll on a coaxial cylindrical wall 29 of the intermediate chassis 10. The floor 3 also rests on horizontal axis rollers 30 secured to the intermediate chassis 10.

The central discharge port 6 is formed as a central evacuation conduit defined by the vertical axis hollow cylindrical wall 29 coaxially with the axis 7. The cylindrical wall 29 is integral with the intermediate chassis 10 and passes at either end through the floor 3 and the intermediate chassis 10.

As can be seen in FIG. 1 the central evacuation conduit 6 communicates the interior of the container of the silo 1 with the outside. To this end two lateral openings of circular projection, 31, 32, and coaxial with the Archimedean screw 2 are formed in the said cylindrical wall 29 and have a diameter greater than that of the Archimedean screw 2. The Archimedean screw 2 extends through these openings 31, 32.

The cylindrical wall 29 of the discharge conduit is open at its lower end 29a and closed at its upper end by a hollow, conical cap 33 coaxial with said cylindrical wall 29 and connected by its base to the latter.

The conical cap 33 prevents the material falling through the central port 6 when the extractor device is stopped and channels the said material downwardly and outwardly toward the said central port 6 when the said device is operating.

The extractor drvice associated with the silo 1 operates as follows. When the screw drive means 14, 15, 16 are energized a programming means, not shown, controls a gradual starting up of the rotation of the screw 2 about its axis, upto a predetermined maximum speed.

The Archimedean screw is now driven to rotate about the axis 7.

The limited torque of the hydraulic drive device 18 to 22 is controlled in such manner that as soon as the resistance on the flights 4, 5 of the particulate material exceeds a predetermined value the rotation of the screw about the axis 7 ceases automatically but restarts when the resistance becomes lower than another predetermined value.

I claim:

1. A silo for storage of a material in particulate form including a container; a side wall and a circular floor to said container; a discharge port located centrally of said floor; an Archimedean screw horizontally disposed diametrically across the container adjacent the floor thereof and over the discharge port; said screw having flights of opposite pitches on opposite sides of the discharge port; first means mounting the screw for rotation about its own axis; means for driving the screw for rotation about its own axis; second means mounting the screw to extend diametrically across said floor and for movement sweeping the floor of the silo; means for revolving the screw about the vertical axis of the silo for sweeping movement in such manner that the flights are able to drive particulate material contained in the silo towards said discharge port during operation of the said rotation drive means and the revolving means; said revolving means comprising bearings mounted for circular orbiting motion about a vertical axis substantially coaxial of said circular floor and the Archimedean screw having ends projecting outwardly beyond said side wall of the container and mounted in said bearings; a stationary circular slideway coaxial with said vertical axis; a common intermediate support mounted on said slideway for rotation about said vertical axis; said bearings of the Archimedean screw being attached to said common intermediate support and said means for rotating the screw about its own axis being carried by said common intermediate support; and means for rotatably connecting said intermediate support means to said revolving means for revolving said screw.

2. A silo as set forth in claim 1, wherein said sweeping drive means include a torque limiting device of calibrated strength and said means for rotating the screw about its own axis comprise a motor and variable speed drive train.

3. A silo as set forth in claim 1, and including means mounting the floor of the silo on said common intermediate support for free rotation about the central axis of the silo.

4. A silo as set forth in claim 1, wherein said discharge port comprises; a central discharge conduit; a hollow cylindrical wall to said conduit coaxial with the floor of the silo and traversing the floor and the common intermediate support integral with said support; two lateral openings to said conduit coaxial with the Archimedean screw and of a diameter greater than that of the Archimedean screw with the Archimedean screw passing therethrough; an open lower end to said conduit and a conical coaxial cap connected to said cylindrical wall to close the upper end of said conduit.

5. In an apparatus for storage of a particulate material having a cylindrical housing enclosing a storage space for said material and having a sidewall and a circular bottom wall spaced below the sidewall with an annular space therebetween, the improved means for removing material from the space comprising a centrally disposed discharge opening in said bottom wall, a wall disposed about the periphery of the opening with a portion thereof above and a portion thereof below the bottom wall, a pair of opposing openings through said wall adjacent to the bottom wall and within said space, a unitary Archimedean screw extending diagonally across the storage space, through the said pair of openings and through said annular space and terminating at each end outside the said sidewall, said screw having flights on opposite sides of said wall about the discharge opening which are helically wound in opposite pitches about the screw and are thereby adapted to move material towards said discharge opening in the bottom wall when the screw is rotated about its longitudinal axis, said pair of openings being of greater cross-section than the cross-section of the screw, a revolvable base, means for supporting and rotating the screw about its longitudinal axis positioned in its entirety outside said cylindrical housing and thereby accessible while the space contains particulate material, said means for supporting and rotating the screw being mounted on said base, and means for revolving said screw, its support and said rotating means about the vertical axis of the cylindrical housing and over the bottom wall.

6. The apparatus of claim 5 wherein said revolvable base is disposed below the said bottom wall, said bottom wall is supported on said base for revolving of the base relative thereto, and said means for revolving said screw, about the vertical axis of the first housing revolves the said base, screw and means for rotating the screw about its longitudinal axis.

* * * * *